United States Patent [19]

Nodd et al.

[11] Patent Number: 4,644,878
[45] Date of Patent: Feb. 24, 1987

[54] SLURRY BURNER FOR MIXTURE OF CARBONACEOUS MATERIAL AND WATER

[75] Inventors: Dennis G. Nodd, West Mifflin; Richard J. Walker, Bethel Park, both of Pa.

[73] Assignee: The United States of America as represented by the United States Department of Energy, Washington, D.C.

[21] Appl. No.: 795,294

[22] Filed: Nov. 5, 1985

[51] Int. Cl.$^4$ .................................................. F23D 1/02
[52] U.S. Cl. .................................. 110/264; 110/347; 239/405; 239/406; 239/424.5; 239/558
[58] Field of Search .................. 110/263, 264, 347; 239/405, 406, 424.5, 558; 431/160

[56] References Cited

U.S. PATENT DOCUMENTS

| | | | |
|---|---|---|---|
| 3,280,882 | 10/1964 | Hemker | 110/264 X |
| 3,299,841 | 10/1965 | Hemker et al. | 110/264 |
| 4,223,615 | 9/1980 | Breen et al. | 110/264 |
| 4,350,103 | 9/1982 | Poll | 110/264 |
| 4,379,689 | 4/1983 | Morck, Jr. | 239/405 X |
| 4,519,322 | 5/1985 | Lindstrom et al. | 110/347 |
| 4,558,652 | 12/1985 | Downs et al. | 110/263 X |
| 4,569,295 | 2/1986 | Skoog | 110/264 X |

OTHER PUBLICATIONS

6th International Symposium on Coal Slurry Combustion & Technology; 6-84, *Program to Develop Anthracite Coal-Liquid Mixtures;* Borden et al.; pp. 751-755.
6th International Symposium on Coal Slurry Combustion; 6-84; *Combustion of Coal-Water etc. in a Firetube Boiler;* Fu et al.
5th International Symposium on Coal Slurry Combustion & Technology; 1983; *Coal Slurry Characteristics of Bituminous & Korean Anthracite;* Kim et al.
4th International Symposium on Coal Slurry Combustion; 1982; *Coal Oil Mixture Utilization in Small Industrial & Commercial Boilers;* Savage et al.

*Primary Examiner*—Edward G. Favors
*Attorney, Agent, or Firm*—Hugh W. Glenn; Paul A. Gottlieb; Judson R. Hightower

[57] ABSTRACT

A carbonaceous material-water slurry burner includes a high pressure tip-emulsion atomizer for directing a carbonaceous material-water slurry into a combustion chamber for burning therein without requiring a support fuel or oxygen enrichment of the combustion air. Introduction of the carbonaceous material-water slurry under pressure forces it through a fixed atomizer wherein the slurry is reduced to small droplets by mixing with an atomizing air flow and directed into the combustion chamber. The atomizer includes a swirler located immediately adjacent to where the fuel slurry is introduced into the combustion chamber and which has a single center channel through which the carbonaceous material-water slurry flows into a plurality of diverging channels continuous with the center channel from which the slurry exits the swirler immediately adjacent to an aperture in the combustion chamber. The swirler includes a plurality of slots around its periphery extending the length thereof through which the atomizing air flows and by means of which the atomizing air is deflected so as to exert a maximum shear force upon the carbonaceous material-water slurry as it exits the swirler and enters the combustion chamber. A circulating coolant system or boiler feed water is provided around the periphery of the burner along the length thereof to regulate burner operating temperature, eliminate atomizer plugging, and inhibit the generation of sparklers, thus increasing combustion efficiency. A secondary air source directs heated air into the combustion chamber to promote recirculation of the hot combustion gases within the combustion chamber.

16 Claims, 13 Drawing Figures

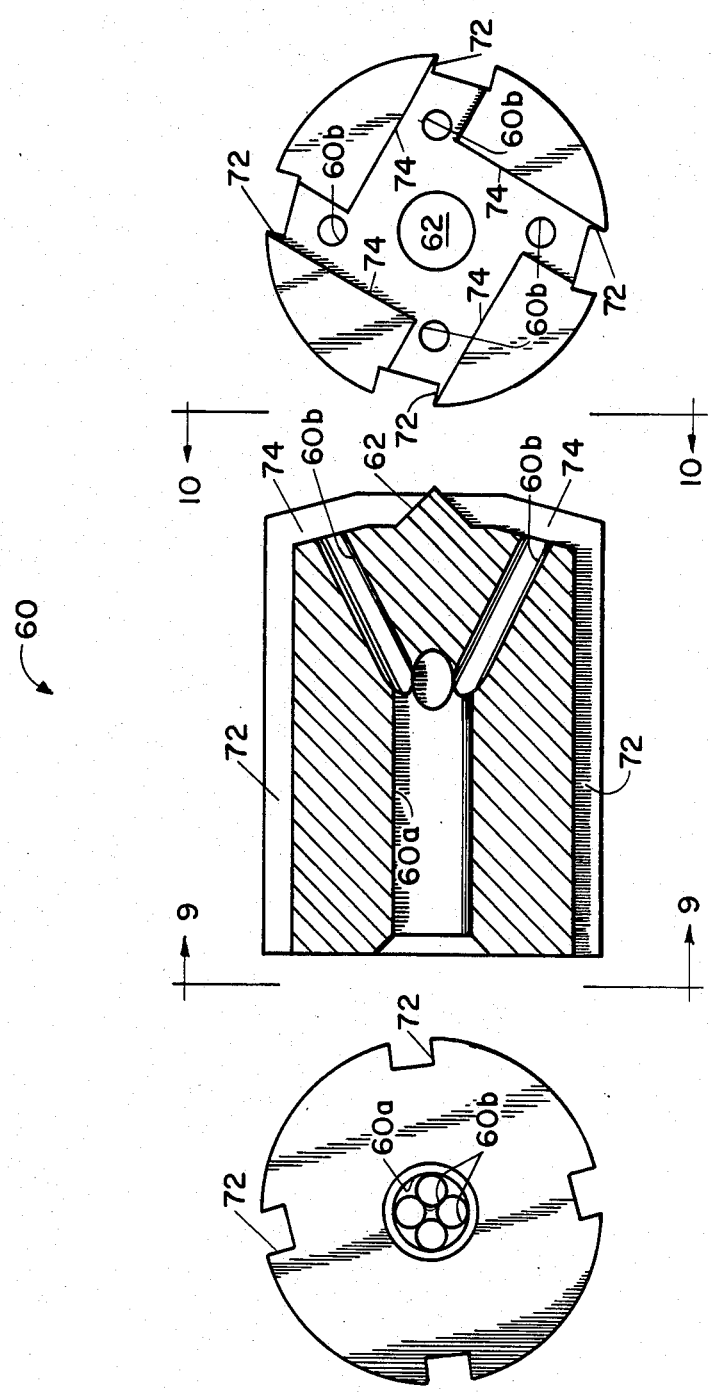

SLURRY BURNER FOR MIXTURE OF CARBONACEOUS MATERIAL AND WATER

CONTRACTURAL ORIGIN OF THE INVENTION

The U.S. Government has rights in this invention under Contract No. DE-AC22-82PC51504 between the U.S. Department of Energy and GE MATSCO.

BACKGROUND OF THE INVENTION

This invention relates generally to the combustion of liquid or slurried carbonaceous material fuels, where the term "carbonaceous material" as used herein means coal (including anthracite), coke (including petroleum coke), char, and oil (natural or synthetic). This invention is particularly directed to an arrangement for directing a coal-water or petroleum-coke-water mixture fuel into a combustion chamber for combustion therein.

A bulk liquid fuel is ideally subjected to an atomization process prior to its combustion for ensuring stable and efficient burning. During this atomization process, the liquid fuel is preferably broken up into the smallest possible droplet size to expedite its preheating and to ensure more probable and timely ignition of the fuel. In the case of a coal-water mixture fuel, atomization of the fuel preferably subdivides the bulk fuel to roughly the size of the coal particles suspended within the slurry to allow preheating and ignition to begin immediately for at least some of the coal particles. If the fuel slurry is not subdivided to this extent, the water tends to encase the coal particles and acts as a thermal insulator resulting in ignition delay and burnout of the fuel. Also, the coal particles tend to agglomerate.

In general, prior art fuel burner arrangements for use with coal-water slurry fuels have sufferend from various limitations. For example, the build-up of unburned carbon residue adjacent to the exit of the fuel delivery tube reduces the fuel flow within the system and degrades the combustion characteristics of the injected fuel. In addition, prior approaches have met with only limited success in attempting to atomize the fuel slurry to particle sizes on the order of the coal particles suspended within the slurry for preheating the coal and improving its combustion ignition. Failure to fully atomize the fuel slurry leads to the deposit of large collections of fuel particles within the combustion chamber and results not only in inefficient combustion but also leads to combustion chamber fouling as its operating characteristics are degraded by the unburned fuel, or slag, which collects therein. Examples of prior art fuel burners can be found in U.S. Pat. Nos. 3,280,882 to Hemker, 3,299,841 to Hemker et al and 4,223,615 to Breen et al as well as in "Coal Oil Mixture Utilization in Small Industrial and Commercial Boilers" by Savage et. al, 4th Int. Symposium on Coal Slurry Combustion, Vol. 2 (1982).

Anthracite coal is a particularly attractive fuel source in some locations because it comprises the largest coal reserves in these locations and possesses a low sulfur content eliminating the environmental requirement in many cases of sulfur dioxide scrubbers in treating the combustion exhaust gases. The close proximity of large deposits of anthracite coal in Eastern Pennsylvania to the New England and Mid-Atlantic industrial regions offers capital and operating cost advantages of anthracite over bituminous coal and further enhances the commercial attractiveness of this source of energy. Anthracite-water slurries thus have the potential to become competitive with bituminous coal and No. 6 fuel oil in both the new and retrofit boiler application markets.

An even more attractive fuel source is petroleum coke. Approximately 17 million tons of petroleum coke are produced annually as a by-produce of oil refinery operations. About half of the annual production (the higher-quality, low-sulfur coke) is used to manufacture industrial products, such as carbon electrodes. However, recently the petroleum industry has been forced to use more lower-grade, high-sulfur crudes, which has led to the production of increasing quantities of undesirable low- and medium-quality coke. The use of these cokes in fuel mixtures with water represents a potential means of disposal while reducing comsumption of fuel oil. The ash content of coke is usually less than 0.5 percent, which adds to its attractiveness as a slurry fuel.

However, anthracite coal and petroleum coke in slurry forms are not without limitations as energy sources. For example, anthracite-water and petroleum-coke-water slurries are difficult to burn without a support fuel and without oxygen enrichment of the combustion air because of their low volatile matter content, which results in long particle burnout times. In addition, while all coal-water slurries are difficult to atomize because they tend to plug passages in nozzles more than coal-oil slurries or fuel oil, anthracite-coal slurries are particularly difficult to atomize because of the hardness of the anthracite and the increased difficulty of reducing the liquid fuel to the smallest possible droplet size. The generally larger anthracite particle sized arising from its relative hardness also result in an increased tendency for it to collect within and clog the fuel flow paths in a fuel burner. Finally, prior art fuel burners have not been adequately isolated from the high temperatures of the combustion chamber and have thus generally operated at reduced efficiencies, have tended to plug up, and have been subject to increased wear exhibiting reduced reliability, particularly in the case of those burners having moving parts. These comments apply especially to small burners.

The present invention is intended to overcome the limitations of the prior art providing a fuel burner particularly adapted for the combustion of carbonaceous material-water slurries which includes a stationary high pressure tip-emulsion atomizer which directs a uniform fuel into a shearing air flow as the carbonaceous material-water slurry is directed into a combustion chamber, inhibits the collection of unburned fuel upon and within the atomizer, reduces the slurry to a collection of fine particles upon discharge into the combustion chamber, and regulates the operating temperature of the burner as well as primary air flow about the burner and into the combustion chamber for improved combustion efficiency, no atomizer plugging and enhanced flame stability.

OBJECTS AND SUMMARY OF THE INVENTION

Accordingly, it is an object of the present invention to provide for improved combustion of a carbonaceous material-water mixture fuel.

It is another object of the present invention to provide an arrangement for introducing a carbonaceous material-water mixture fuel into a combustion chamber in a manner which provides improved flame control and stability, more efficient combustion of the hydrocarbon fuel, and continuous, reliable burner operation.

Yet another object of the present invention is to provide for the continuous, sustained combustion of a carbonaceous material-water mixture fuel without the need for a secondary combustion source such as natural gas or a liquid hydrocarbon fuel.

Still another object of the present invention is to provide a burner arrangement capable of accommodating a carbonaceous material-water mixture fuel having a wide range of rheological and combustion characteristics in providing for its efficient combustion.

A further object of the present invention is to provide a fuel burner arrangement particularly adapted for the combustion of an anthracite-water or petroleum-coke-water fuel slurry.

A still further object of the present invention is to provide for the stable combustion of a carbonaceous material-water slurry without oxygen enrichment of the combustion air.

This invention contemplates a carbonaceous material-water mixture fuel burner for directing a carbonaceous material-water slurry into a combustion chamber such as a furnace or boiler for sustaining the efficient combustion of the fuel slurry therein. A carbonaceous material-water slurry source is coupled to a first end of a fuel atomizer by means of an elongated hollow tube through which the carbonaceous material-water slurry is provided to the atomizer. The second end of the atomizer is positioned within an aperture in a wall of the combustion chamber for directing the slurry therein.

Coaxially positioned about the fuel delivery tube is an outer tube which is coupled to an atomizing air source for delivering atomizing air under pressure to the second end of the atomizer. The first end of the atomizer includes a center channel into which the fuel slurry is introduced for displacement within and along the length of the atomizer. The second end of the atomizer includes a swirler having a plurality of radiating ducts continuous with the center channel for directing the fuel slurry outward from the center of the atomizer from which the fuel slurry exits at the second end thereof. The atomizing air is directed across the exiting fuel slurry generally transverse to the direction of flow of the fuel slurry and thus exerts a maximum shear force thereon. Slots in the second end of the swirler direct the fuel slurry and air in a rotational path about the longitudinal axis of the swirler to further reduce the slurry to a collection of thoroughly mixed fine particles and small droplets as the mixture exits the atomizer and is directed into the combustion chamber. Large angle turns in the flow of the carbonaceous material-water slurry as well as dead volume in the slurry path are eliminated to prevent burner plugging and provide improved mixing of the carbonaceous material-water-air mixture prior to its deposit within the combustion chamber.

A circulating water system encompasses the burner along the length thereof for regulating its temperature and reducing the likelihood of sparkler production and thus increases combustion efficiency. A secondary air source directs heated secondary air to a baffle and adjustable vane arrangement positioned at the second end of the nozzle where the carbonaceous material-water slurry enters the combustion chamber in a manner which allows for the pitch angle and, as a result, the swirl of the thus introduced secondary air to be varied as desired to promote recirculation of the hot combustion gases to the ignition zone within the combustion chamber for improved flame stability and combustion control.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 8 is a lateral sectional view of a swirler for use in the atomizer portion of the carbonaceous material-water slurry burner of the present invention;

FIG. 9 is an aft end-on view of the swirler of FIG. 8 taken along sight line 9—9 therein;

FIG. 10 is a front end-on view of the swirler of FIG. 8 taken along sight line 10—10 therein;

DETAILED DESCRIPTION OF THE PREFERRED EMBODIMENT

Figure 1:
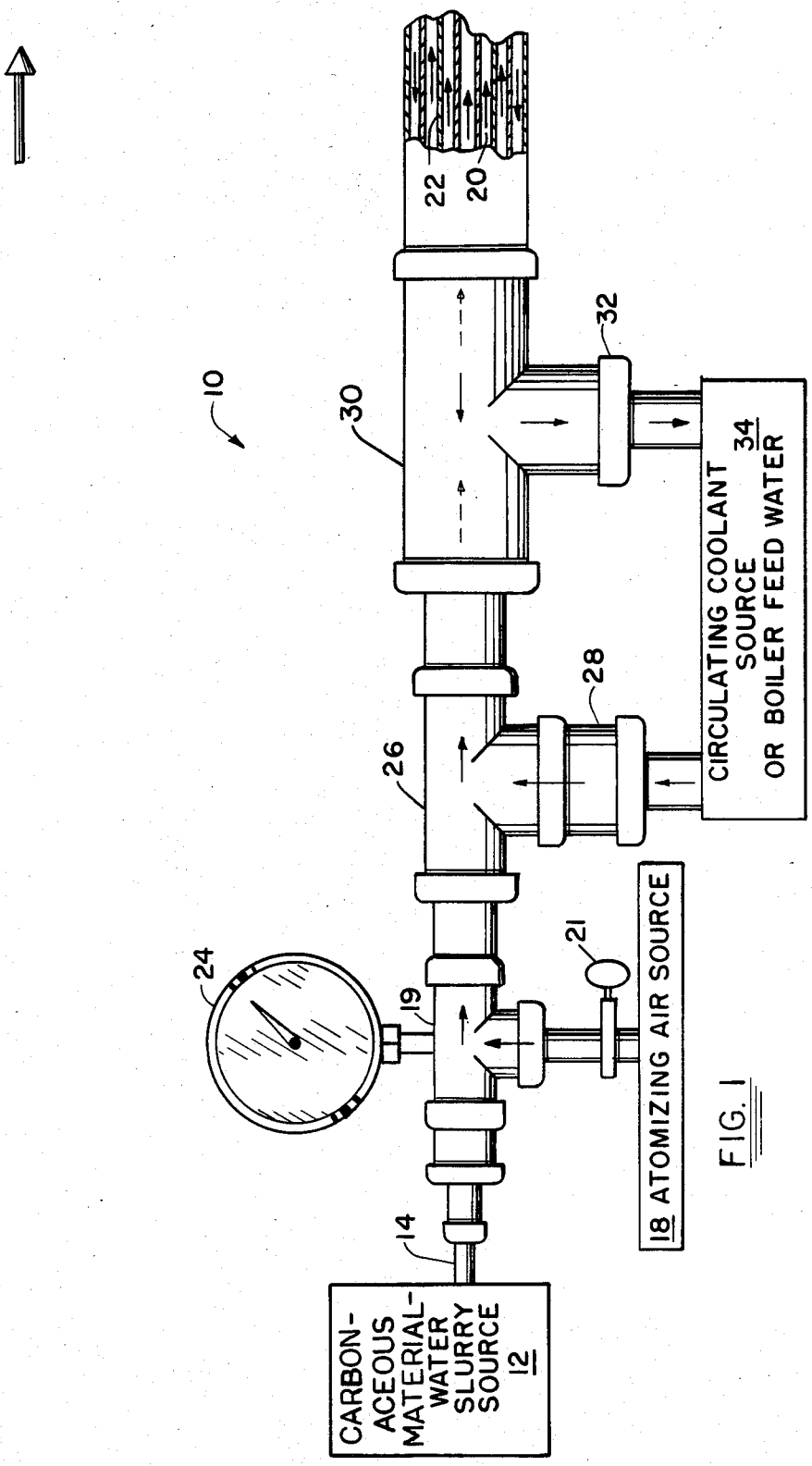
FIG. 1 is a lateral sectional view taken along the length of the carbonaceous material-water slurry burner of the present invention.
Figure 1:
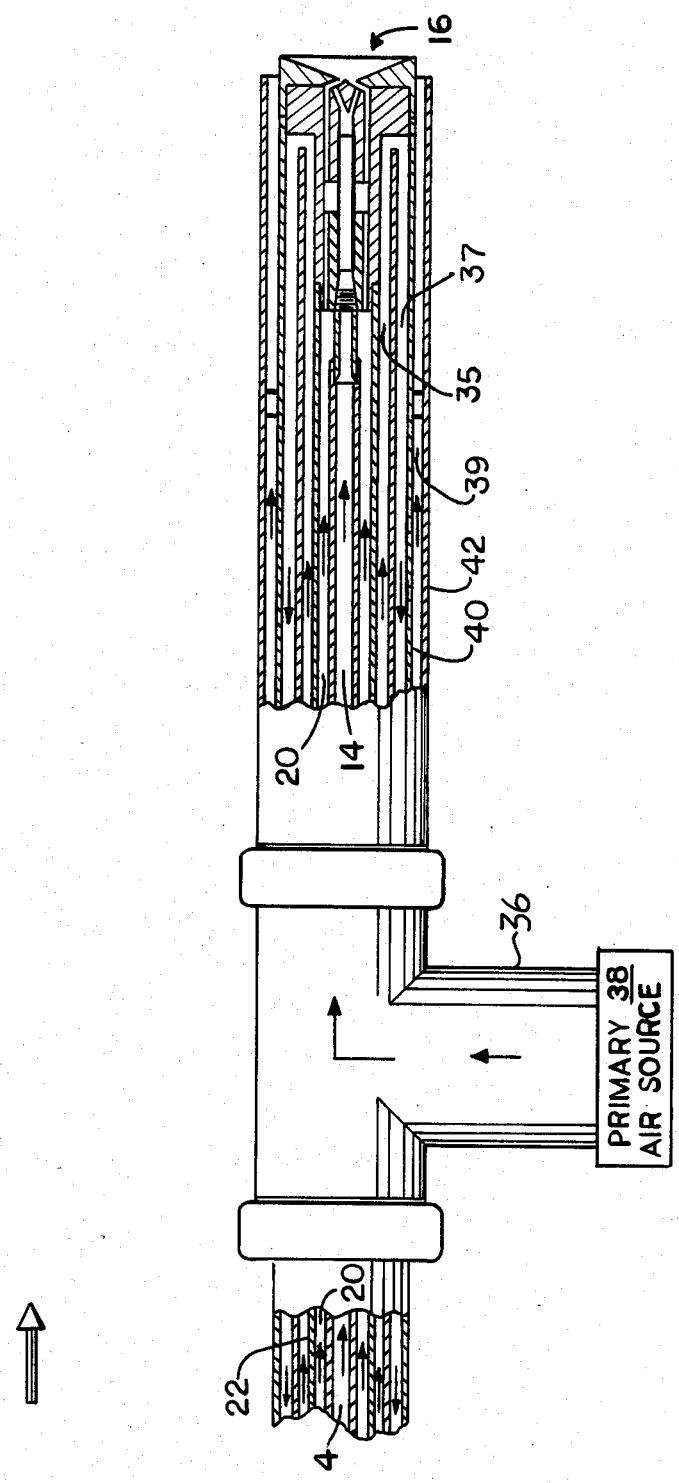

Referring to FIG. 1, there is shown a lateral sectional view of a carbonaceous material-water slurry burner 10 in accordance with the present invention. The burner 10 includes a hollow fuel delivery tube 14 coupled at a first end to a carbonaceous material-water slurry source 12 and at a second end to a fuel atomizer 16. The fuel slurry is directed into and along the fuel delivery tube 14 by the carbonaceous material-water slurry source 12 and exits the fuel burner 10 from the fuel atomizer 16 end thereof. The direction of fuel slurry flow within the fuel burner 10 is shown by the arrows in the fuel delivery tube 14.

Coaxially positioned about the fuel delivery tube 14 along the length thereof is an elongated, hollow atomizing air tube 22 which forms an atomizing air duct 20 around the fuel delivery tube 14. An atomizing air source 18 is coupled to a first end of the atomizing air duct 20 by means of a T-fitting 19. Air under pressure from the atomizing air source 18 flows in the direction of the arrows in FIG. 1 within the atomizing air duct 20 to the fuel atomizer 16 connected to a second end of the atomizing air duct. The atomizing air is then mixed with the carbonaceous material-water slurry in the fuel atomizer 16 so as to form a fuel mixture of small particles which is directed by the fuel burner 10 into a combustion chamber (not shown in FIG. 1). The manner in which the atomized carbonaceous material-water fuel slurry is mixed with the atomizing air is described in detail below. A gauge 24 is coupled to the T-fitting 19 and is responsive to the pressure within the atomizing air duct 20 is provide a visual indication of atomizing air flow pressure to the fuel atomizer 16. Conventional means such as a manually controlled valve 21 may be provided for regulating the atomizing air flow within the carbonaceous material-water slurry burner 10. When used with an anthracite-water or petroleum-coke-water slurry, the atomizing air is typically provided at 79 psia while the fuel slurry pressure is maintained at approximately 78 psia.

Also coupled to the carbonaceous material-water slurry burner 10 by means of a T-fitting 36 is a primary air source 38. The primary air source provides primary air to a second end of the fuel burner 10 via a primary air channel 39 coaxially positioned between a cylindrical housing 40 and an elongated, hollow outermost tube 42. Primary air under pressure and unheated is directed within the primary air channel 39 along the length thereof toward the fuel atomizer 16 where it is introduced into a combustion chamber in a controller manner to promote recirculation of the hot combustion gases to the ignition zone within the combustion chamber for enchanced flame stability as described in detail below. It should be noted that when burning anthracite coal or petroleum coke in the carbonaceous material-water slurry burner 10 of the present invention primary air would not be employed. Since the details of the atomizing and primary air sources 18, 38 do not form a part of the present invention, these elements are not further described herein.

Also coupled to the aforementioned cylindrical housing 40 portion of the carbonaceous material-water slurry burner 10 by means of a first combination of a T-fitting 26 and a hydraulic coupling 28 and a second combination of a T-fitting 30 and a hydraulic coupling 32 is a circulating coolant source 34. The circulating coolant source 34, which may be conventional in design and operation, or could be boiler feed water provides a liquid coolant such as water to the fuel burner for preventing radiant heat from overheating the slurry before it leaves the fuel atomizer 16 which inhibits the plugging of the fuel burner by the fuel slurry and reduces the production of "sparklers" by the burner. The elimination of sparklers produced by the fuel burner 10 improves combustion efficiency of the carbonaceous material-water slurry.

Figure 2:
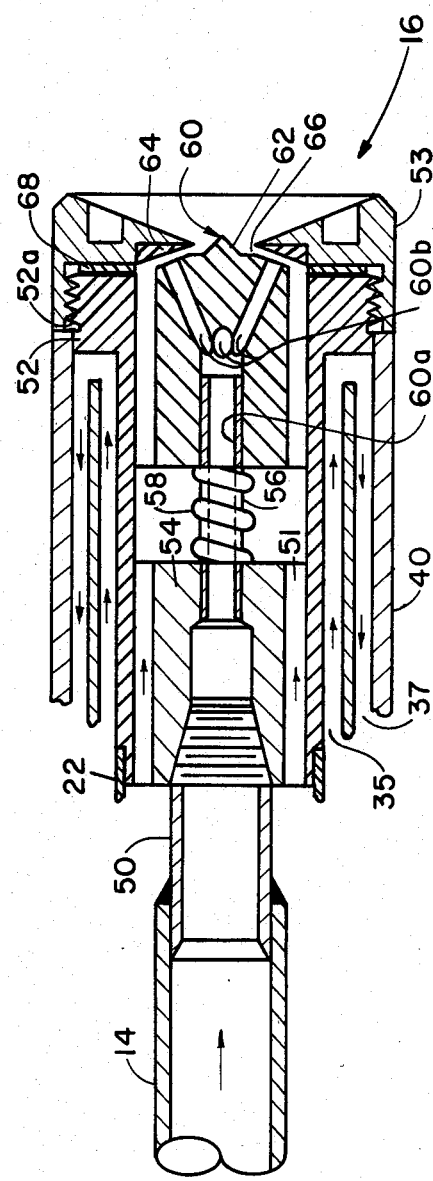
FIG. 2 is a lateral sectional view of the atomizer portion of the carbonaceous material-water slurry burner of FIG. 1.

Referring to FIG. 2, there is shown an enlarged lateral sectional view of the fuel atomizer 16 used in the carbonaceous material-water slurry burner 10 of FIG. 1. From FIG. 2, it can be seen that cylindrical housing 40 includes a water delivery duct 35 and a water return duct 37 which form a continuous flow path for the coolant liquid provided by the coolant source 34. Also from FIG. 2, it can be seen that the fuel atomizer 16 includes a nozzle 52 which is coupled to the fuel delivery tube 14 by means of an elongated stainless steel pipe 50. The nozzle 52 receives the carbonaceous material-water slurry from the fuel delivery tube 14 and directs it into a combustion chamber which, although not shown in FIG. 2, is positioned immediately to the right of the fuel atomizer 16 shown therein.

Figure 5:
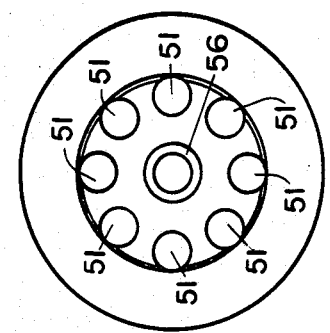
FIG. 5 is a front end-on view of the nozzle shown in FIG. 3 taken along sight line 5—5 therein.
Figure 3:
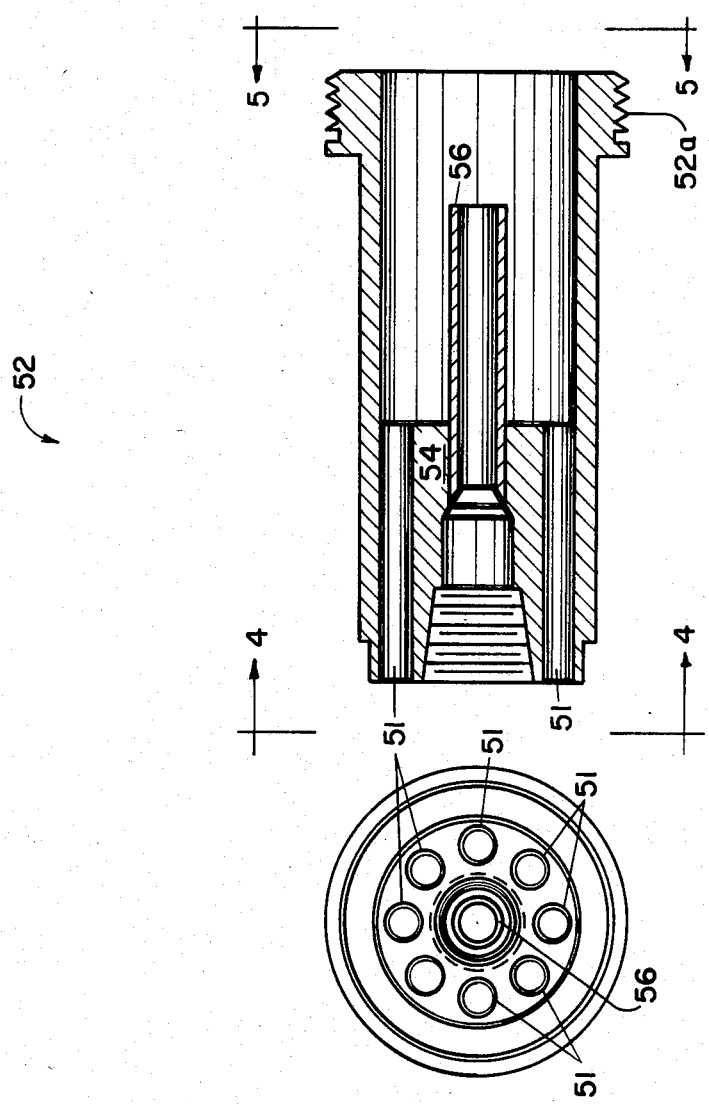
FIG. 3 is a lateral sectional view of the nozzle portion of the atomizer shown in FIG. 2.
Figure 4:
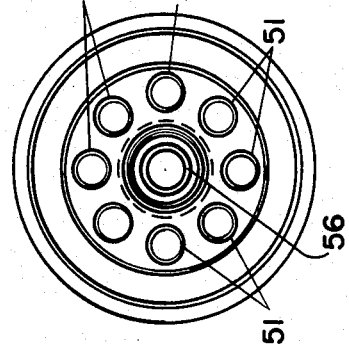
FIG. 4 is an aft end-on view of the nozzle of FIG. 3 taken along sight line 4—4 therein.

A lateral sectional view of the nozzle portion of the fuel burner atomizer 16 of FIG. 2 is shown in FIG. 3. In addition, FIGS. 4 and 5 illustrate aft and front end-on views of the nozzle 52 of FIG. 3 respectively taken along sight lines 4—4 and 5—5 therein. The nozzle 52 is generally cylindrical in cross-section and includes an aft apertured portion 54 and a swirler 60. The aft portion 54 of the nozzle 52 includes a plurality of circular ducts 51 therein, as shown in FIGS. 4 and 5, which extend along a portion of the length of the nozzle. Each of these ducts 51 is continuous with the aforementioned annular atomizing air duct 20 and allows atomizing air to be directed into and along the nozzle 52. Coupled to a forward portion of the aft portion 54 of the nozzle 52 is a stainless steel tube 56 which is continuous with the fuel delivery tube 14 and the stainless steel pipe 50 coupled to one end thereof. The tube 56 delivers the carbonaceous material-water slurry fuel to the swirler portion of the nozzle 52.

Referring to FIG. 8, there is shown a lateral sectional view of the swirler 60 employed in the nozzle portion of the fuel atomizer 16. Aft and forward end-on views of the swirler 60 shown in FIG. 8 respectively taken along sight lines 9—9 and 10—10 therein are shown in FIGS. 9 and 10. The one-piece swirler 60 located in a forward portion of the nozzle 52 includes an aft flow channel 60a which is aligned along the center of the swirler and extends along a portion of the length thereof. The aft flow channel 60a of the swirler 60 is adapted to receive the tube 56 coupled to the aft portion 54 of the nozzle for receiving the carbonaceous material-water slurry fuel mixture therefrom. A forward portion of the swirler 60 includes a plurality of forward flow channesl 60b which extend forward of the aft flow channel 60a therein and radiate outwardly from the center line of the swirler 60. The forward end portion of the swirler 60 is provided with a pintle 62 which is positioned within the generally circular array of the forward flow channels 60b on the forward surface of the swirler 60. The carbonaceous material-water slurry thus is directed along the fuel delivery tube 14 to the aft portion 54 of the nozzle 52 and thence to the swirler 60 in the forward end portion thereof. The carbonaceous material-water slurry exits the nozzle from the forward surface thereof in a generally circular array from the forward flow channels 60b.

Located around the periphery of the swirler 60 and extending the length thereof are a plurality of slots 72. Each of the slots 72 forms a channel with the nozzle 52 located immediately outward therefrom. Each of the channels formed of the aforementioned slots 72 is continuous with the plurality of ducts 51 in the aft portion 54 of the nozzle for directing atomizing air to a forward portion of the swirler 60. From FIGS. 8, 9 and 10, it can be seen that the forward flow channels 60b within the swirler 60 are in closely spaced relation where they are coupled to the aft flow channel 60a and extend forwardly and outwardly from the swirler's center line. Each of these forward flow channels 60b exits a forward portion of the swirler 60 at a location displaced somewhat inwardly from the periphery of the swirler 60. In addition, where each of these forward flow channels 60b exits the swirler 60, there is positioned a respective elongated, linear forward slot 74 which is aligned with a respective peripheral slot 72 of the swirler. Thus it can be seen that as the atomizing air travels toward the forward end of the swirler 60, it is deflected inwardly toward the swirler's center line along a forward portion thereof with the atomizing air flowing along and within the aforementioned forward slots 74 within the swirler. The atomizing air thus is directed generally transversely to the flow of carbonaceous material-water slurry exiting the forward end portion of the swirler 60 to impose a maximum shear force thereon. This maximizes the break-up and atomization of the carbonaceous material-water slurry as it exits the nozzle 52. The sharp edges present where the swirler's aft flow channel 60a meets the forward flow channels 60b minimized the build-up of solid deposits in the nozzle 52.

Figure 7:
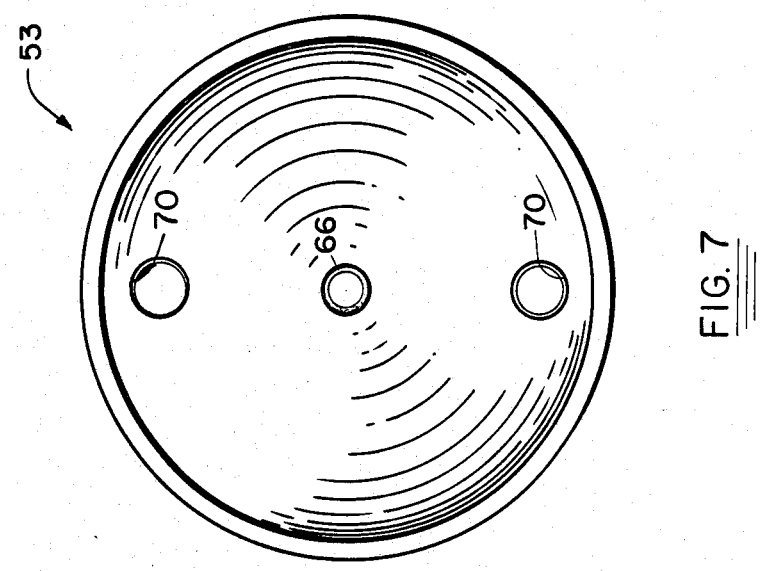
FIG. 7 is a front end-on view of the nozzle cap shown in FIG. 6 taken along sight line 7—7 therein.
Figure 6:
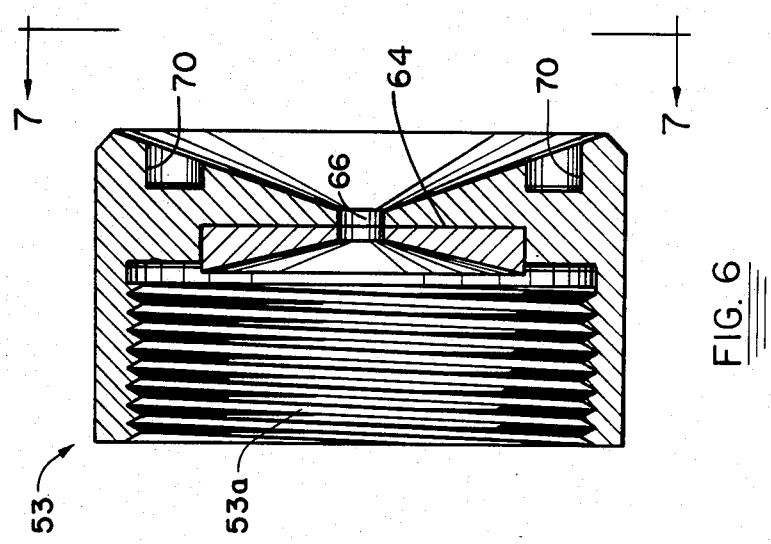
FIG. 6 is a sectional view of a nozzle cap for use with the nozzle of FIG. 3.

A forward, peripheral portion of the nozzle 52 is provided with threads 52a thereon. The threaded portion 52a of the nozzle 52 is adapted to receive a complementary threaded portion of a nozzle cap 53 as shown in FIG. 2. Lateral sectional and front end-on views of the nozzle cap 53 are respectively shown in FIGS. 6 and 7. The forward surface of the nozzle cap 53 is provided with first and second holes 70 for receiving a spanner wrench (not shown) to facilitate the secure positioning of the nozzle cap 53 upon the forward end portion of the nozzle 52 by means of the aforementioned complementary threaded portions. The nozzle cap 53 includes a center aperture 66 therein through which the pintle 62 of the swirler 60 extends. Positioned within the nozzle cap 53 and around the center aperture 66 therein is a nozzle insert 64. The nozzle insert 64, which is preferably comprised of tungsten carbide for reduced wear, is adapted to receive and engage in abutting contact the forward end portion of the swirler 60. The swirler 60 is maintained in secure contact with the nozzle insert 64 by means of a coiled spring 58 which is positioned about the stainless steel tube 56 and urges the swirler 60 in a forward direction toward the nozzle cap 53. It is by means of the aforementioned forward slots 74 in the forward end portion of the swirler 60 that the carbonaceous material-water slurry as well as the atomizing air stream is directed through the center aperture 66 within the nozzle burner 64 and exits the carbonaceous material-water slurry burner 10. A copper gasket 68 is positioned between the nozzle 52 and the nozzle cap 53 when they are in secure threaded engagement to prevent leakage of the carbonaceous material-water slurry from the burner and maximize heat transfer. The nozzle 52 and nozzle cap 53 is preferred embodiment are comprised of beryllium copper or similar alloy for improved thermal conductivity. The pintle 62 improves the fuel atomization and spray pattern. The heat conducting nozzle, copper gasket, and nozzle cap and the aforementioned burner water cooling system prevent radiant heat from overheating the slurry before it leaves the atomizer which prevents plugging and sparklers. Finally, from FIG. 10 is can be seen that the cabonaceous material, water and atomizing air is subject to a swirling action by virtue of the alignment of the forward slots 74 on the swirler 60.

Figure 11:
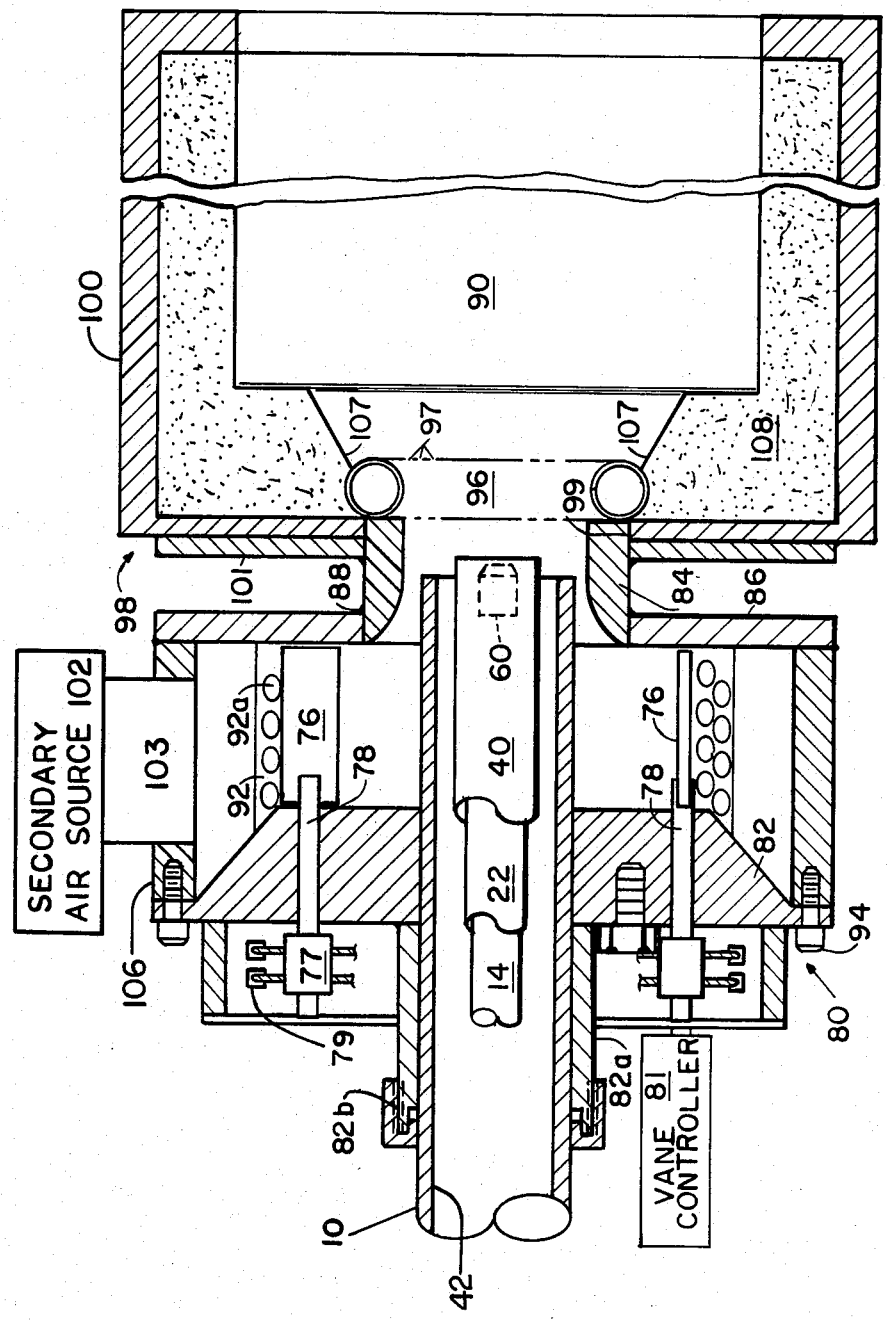
FIG. 11 is a sectional view illustrating the positioning of the carbonaceous material-water slurry burner on a combustion chamber in accordance with the principles of the present invention.

Referring to FIG. 11, there is shown a sectional view illustrating the positioning of the cabonaceous material-water slurry burner 10 on a combustion chamber 98 in accordance with the principles of the present invention. In the embodiment shown in FIG. 11, a secondary air source 102 and secondary air flow control arrangement is shown positioned adjacent to where the cabonaceous material-water slurry burner 10 is mounted to the combustion chamber 98.

As shown in FIG. 11, the carbonaceous material-water slurry burner 10 is secured to the combustion chamber 98 immediately adjacent to an aperture 99 therein by means of a high swirl air register 80. The high swirl air register 80 includes a front plate 82 having an aperture therein about which is positioned a generally cylindrical lateral extension 82a of the front plate. The distal portion of the front plate's lateral extension 82a is provided with a threaded outer surface 82b. The outer periphery of the carbonaceous material-water slurry burner 10 is provided with a complementary threaded nut for engaging the threaded portion 82b of the front plate 82 to allow for adjustable coupling between the carbonaceous material-water slurry burner and the high swirl air register 80. With the carbonaceous material-water slurry burner 10 thus adjustably coupled to the high swirl air register 80, the fuel burner is positioned within and extends through the aperture within the front plate 82 of the high swirl air register 80.

With the front plate 82 of the high swirl air register 80 thus adjustably coupled to the carbonaceous material-water slurry burner 10, the air register's front plate is further coupled to a generally circular housing 106 by means of a plurality of coupling screws 94. The housing 106 is, in turn, positioned upon and coupled to a secondary air throat 84. The secondary air throat 84 is mounted to a lateral wall of the combustion chamber 98 about the aperture 99 therein. Weld 88 ensures secure coupling between the secondary air throat 84 and the back plate 86 as well as the air register 80. The secondary air throat 84 is positioned within and about the combustion chamber's aperture 99 for deflecting the primary and secondary air as well as the carbonaceous material-water fuel slurry and atomizing air into the ignition zone 90 within the combustion chamber 98.

Positioned within the air register's front plate 82 in a generally circular array are a plurality of support shafts 78. Each of the support shafts 78 is free to rotate within the air register's front plate 82 and has mounted to a first end thereof a vane or fin 76 and to a second end thereof a sprocket 77. Each of the vanes 76 is positioned within the chamber defined by the air register's front plate 82, housing 106 and back plate 86. Each of the sprockets 77 is positioned outside of the aforementioned chamber and is coupled to two drive chains 79. Coupled to one of the support shafts 78 is a vane controller 81 by means of which the vane may be rotationally displaced within the air register's front plate 82 in order to change the orientation of the vane 76 attached to the other end of the support shaft. By providing each support shaft 78 with a respective sprocket 77 and coupling all of the sprockets by means of the two drive chains 79, rotation of one of the support shafts by means of the vane controller 81 will cause a corresponding rotational displacement of each of the other support shafts and respective vanes attached thereto. In this manner, the flow of the secondary air within the high swirl air register 80 may be regulated in order to control the secondary air swirl and hence the flame stability in the combustion chamber. The dead space 39 around the burner reduces heat transfer to the atomizer and facilitates recirculation of the products of combustion and enhances flame stability when an anthracite-water or petroleum-coke-water slurry is provided to the carbonaceous material-water slurry burner 10. For other fuels the dead space 39 is generally used for primary air flow and thus is generally not dead.

Figure 12:
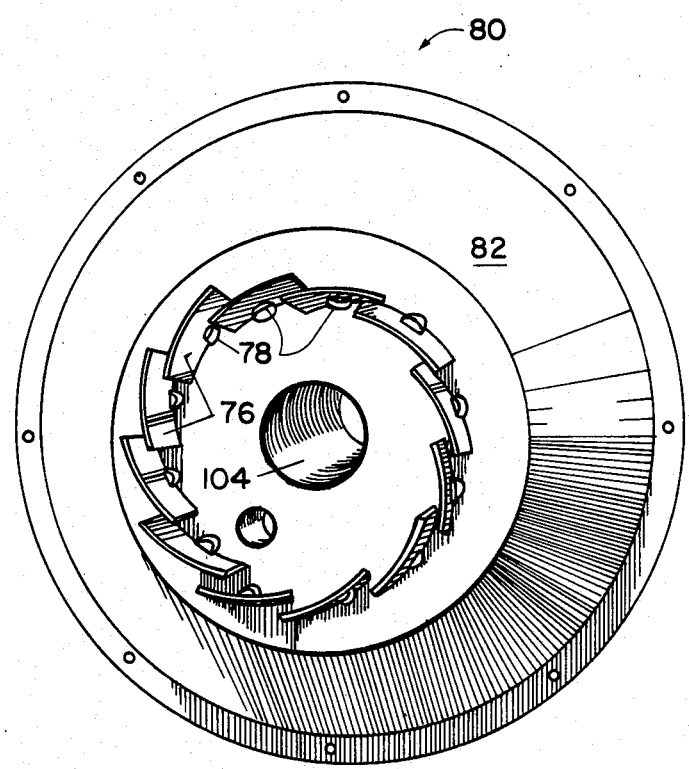
FIG. 12 illustrates an air register plate for positioning on the end of the carbonaceous material-water slurry burner for directing by means of a plurality of adjustable vanes a secondary air flow onto the fuel slurry and atomizing air exiting the burner.

Referring to FIG. 12, there is shown a rear view of the high swirl air register 80 within which the carbonaceous material-water slurry burner is positioned and which itself is attached to circular housing 106. The carbonaceous material-water slurry burner is positioned within the air register's central aperture 104 around which are positioned the plurality of movable vanes 76. Each of the vanes is securely to an end of a rotatable support shaft 78. The front plate 82 portion of the high swirl air register 80 is adapted for secure coupling to housing 106 which is shown in FIG. 11. Small tip clearances between the short-span air deflection vanes 76 and front plate 82 as well as back plate 86 provide high secondary air swirl and hence enhanced flame stability.

Figure 13:
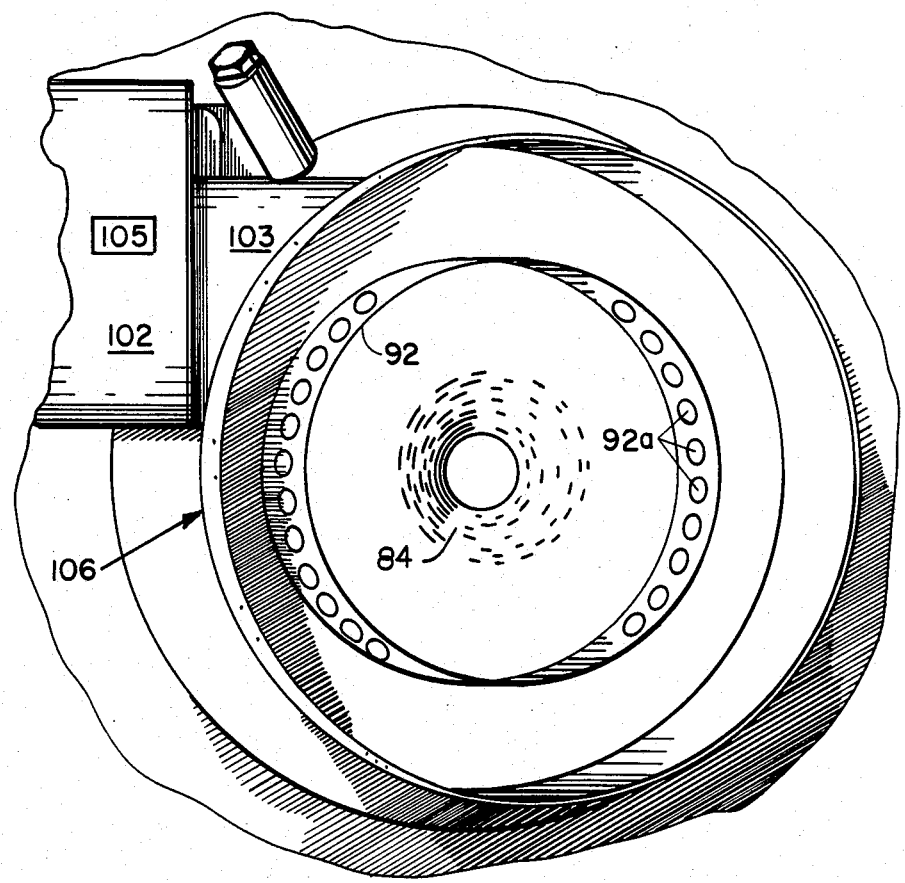
FIG. 13 shows an air register plate having a baffle positioned on the end of the carbonaceous material-water slurry burner through which secondary air flows.

Also positioned within the high swirl air register 80 and mounted to a forward surface of the front plate 82 is a generally cylindrical baffle 92 having a plurality of apertures 92a therein. A rear view of the high swirl air register 80 showing the arrangement of the baffle structure 92 therein is illustrated in FIG. 13. A secondary air source 102 coupled to the air register 80 via a secondary air duct 103 directs secondary air tangentially into the air register. The second air thus swirls in a generally circular path around and within the air register 80 and passes through the cylindrical baffle 92 therein. The secondary air is thus introduced into the air register 80 adjacent to an outer portion thereof and travels in a somewhat helical path toward the center of the air register where it mixes with the carbonaceous material-water fuel slurry, atomizing air, and primary air as it exits the burner and enters the combustion chamber. The cylindrical baffle 92 within the air register 80 provides for the more uniform distribution of the secondary air as it transits the air register and exits into the combustion chamber but is not essential. The secondary air passes between the forward end portion of the carbonaceous material-water slurry burner 10 and an inner portion of the secondary air throat 84 as it enters the combustion chamber 98.

The secondary air from the secondary air source 102 is preferably heated prior to its introduction into the air register 80 for supporting the combustion of the carbonaceous material-water mixture fuel within the combustion chamber 98. The secondary air source 102 may include a blower or any conventional means for generating an air flow. Similarly, a secondary air heater 105 may take the form of virtually any conventional arrangement for heating and transmitting a continuous flow of air. In a preferred embodiment, the secondary air is heated to approximately 755° F. for anthracite-water or petroleum-coke-water slurries. Similarly, the aforementioned vane controller 81 may be conventional in design and operation and could include an electric motor for effecting the rotational displacement of all of the vanes 76 within the high swirl air register 80 in unison. By adjusting the angular position of the vanes 76 within the air register 80, the amount of swirl imparted to and the flow of secondary air into the combustion chamber 98 may be regulated for controlling the flame recirculation pattern therein. The swirling secondary air flow directed into the combustion chamber 98 by the vanes 76 creates a low pressure area at the outlet of the carbonaceous material-water slurry burner 10 for generating a re-circulating flame pattern within the combustion chamber.

As shown in FIG. 11, a natural gas ring 96 having a plurality of apertures 97 therein may be positioned immediately adjacent to a quarl 107 of the combustion chamber 98. As shown in FIG. 11, the combustion chamber 98 would also typically include a mounting flange 101 positioned against the aformentioned wall. The natural gas ring 96 is positioned immediately adjacent to and around the periphery of the circular aperture 99 within the combustion chamber 98. In a preferred embodiment, the natural gas ring 96 is generally circular and includes a plurality of equally spaced apertures 97 about the length thereof. The natural gas ring 96 provides secondary fuel for initiating operation of the carbonaceous material-water mixture fuel burner 10 of the present invention. Once stable combustion of the carbonaceous material-water mixture fuel flowing through the burner of the present invention is established, the supply of natural gas to the combustion chamber 98 may be terminated with the carbonaceous material-water slurry burner providing the fuel slurry to the combustion chamber for sustaining combustion therein. The ignition zone 90 within the combustion chamber 98 is defined by a refractory flame oven cone, or quarl, 107 and a refractory lining 108. The refractory flame oven cone (or quarl) 107 and the refractory lining 108 serve to radiate and reflect heat back into the ignition zone 90 for enhanced flame stability, especially for anthracite and petroleum coke.

There has thus been shown a carbonaceous material-water slurry burner particularly adapted for the combustion of a water slurry of anthracite coal or petroleum coke. The carbonaceous material-water slurry burner is capable of operating for extended periods without clogging by the fuel, isolates the burner as well as the carbonaceous material-water slurry within the burner from the heat of an adjacent combustion chamber for eliminating sparklers, eliminating nozzle plugging, and enhancing combustion efficiency, and allows for the combustion of a carbonaceous material-water slurry without a support flame from another fuel or oxygen enrichment of the combustion air. The carbonaceous material-water slurry burner opeates without continuously moving parts in providing a finely atomized carbonaceous material-water and air mixture to a combustion chamber such as in a boiler or furnace for efficient, self-sustaining combustion therein.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claim when viewed in their proper perspective based on the prior art.

The embodiments of the invention in which an exclusive property or privilege is claimed are defined as follows:

1. A burner for atomizing and directing a carbonaceous material-water slurry into a combustion chamber comprising:

a fuel delivery tube into which the carbonaceous material-water slurry is introduced and displaced therealong toward a first end thereof;

an atomizing air tube coaxially positioned about said fuel delivery tube, said atomizing air tube coupled to an atomizing air source wherein said atomizing air source directs atomizing air under pressure into said atomizing air tube toward a first end thereof;

a fixed generally cylindrical nozzle mounted to said combustion chamber and coupled to the respective first ends of said fuel delivery tube and said atomizing air tube, said nozzle having a plurality of outer channels continuous with said atomizing air tube at the first end thereof through which said atomizing air is directed and an inner, aft center fuel channel coupled to and continuous with said fuel delivery tube at the first end thereof, said nozzle further including a plurality of forward inner diverging fuel channels coupled to and continuous with said aft center fuel channel and forming relatively small acute angles therewith and through which the carbonaceous material-water slurry is directed toward the outer periphery of a forward end portion of said nozzle and exits therefrom, said nozzle further including a plurality of slots positioned upon a front surface thereof and in communication with a respective diverging fuel channel as it exits said nozzle and extending from the periphery of said nozzle generally toward the center thereof;

outer deflection means positioned immediately adjacent to the forward end portion of said nozzle for deflecting the atomizing air from said outer channels through said slots and generally transversely across the carbonaceous material-water slurry as it exits the nozzle thus exerting a maximum shear force upon the carbonaceous material-water slurry for the atomization thereof, said first deflection means having a generally circular aperture therein; and inner deflection means positioned on the forward end portion of the nozzle and disposed within the aperture of said first deflection means so as to form an annular aperture therewith for further atomizing and directing the carbonaceous material-water slurry through said annular aperture and into the combustion chamber.

2. The burner of claim 1 wherein said nozzle further includes a forward swirler portion positioned adjacent to the combustion chamber for directing the carbonaceous material-water slurry into the combustion chamber in a dispersed manner.

3. The burner of claim 2 wherein the coupling between the aft center and forward diverging fuel channels is defined by a plurality of sharp edges and large apertures to reduce the tendency of the carbonaceous material-water slurry to collect within and clog said nozzle.

4. The burner of claim 2 wherein the forward swirler portion of said nozzle includes said front slots and wherein said front slots are positioned in diverging relation upon the front surface of said nozzle to impart a swirling motion to the carbonaceous material-water slurry and atomizing air mixutre exiting said nozzle.

5. The burner of claim 1 wherein said outer deflection means includes a nozzle end cap threadably engaging a forward portion of said nozzle and said nozzle further includes displacement means positioned between the aft and forward portions thereof for urging the forward swirler portion of said nozzle into tight-fitting engagement with said nozzle cap.

6. The burner of claim 1 further including means for cooling the burner and carbonaceous material-water slurry as it passes therethrough for preventing radiant heat from the combustion chamber from overheating the carbonaceous material-water slurry before it exits said nozzle.

7. The burner of claim 6 wherein said means for cooling the burner and carbonaceous material-water slurry includes a circulating coolant system positioned about said atomizing air tube and said atomizing means for dissipating heat transferred to the burner and the carbonaceous material-water slurry therein from the combustion chamber.

8. The burner of claim 6 wherein said means for cooling the burner and carbonaceous material-water slurry includes a boiler feed water system positioned about said atomizing air tube and said atomizing means for dissipating heat transferred to the burner and the carbonaceous material-water slurry therein from the combustion chamber.

9. The burner of claim 1 further including control means coupled between said atomizing air source and said atomizing air tube for regulating the flow of atomizing air within the burner.

10. The burner of claim 1 further including a secondary air source for directing secondary air into the combustion chamber about the periphery of said atomizing means for controlling the combustion of the carbonaceous material-water slurry.

11. The burner of claim 10 wherein said secondary air source includes a blower coupled to an annular chamber connected to said secondary air source wherein a plurality of adjustable vanes are positioned within said annular chamber for directing the secondary air into the combustion chamber at a given entry angle.

12. The burner of claim 11 wherein said plurality of adjustable vanes are positioned within said annular chamber in a generally circular, closely spaced array for directing the secondary air in a swirling manner within said annular chamber.

13. The burner of claim 12 further including heating means for heating the secondary air between said secondary air source and said annular chamber.

14. The burner of claim 1 further including a secondary fuel source positioned within the combustion chamber adjacent to said secondary air source for intiating combustion of the carbonaceous material-water slurry.

15. The burner of claim 14 wherein said secondary fuel source includes a circular ring positioned within the combustion chamber and immediately adjacent to and about said secondary air source, said circular ring having at least one aperture therein through which a combustible fuel is directed into the combustion chamber.

16. The carbonaceous material-water mixture fuel burner of claim 15 wherein said combustion chamber is a fire tube or water tube boiler having a refractory flame oven cone (quarl) and a refractory lining therein, wherein said refractory flame oven cone and said refractory lining are positioned adjacent to said circular ring secondary fuel source and said atomizing means for reflecting heat back into an ignition zone within the combustion chamber for enhanced flame stability.

* * * * *